(12) United States Patent
Gutsche et al.

(10) Patent No.: US 9,720,264 B2
(45) Date of Patent: Aug. 1, 2017

(54) POLARIZATION-MAINTAINING OPTICAL FIBRE AND PREFORM AND METHOD FOR PRODUCING THE SAME

(71) Applicant: J-FIBER GMBH, Jena (DE)

(72) Inventors: Thomas Gutsche, Jena (DE); Wolfgang Hämmerle, Jena (DE); Robert Hanf, Eisenberg (DE); Lothar Brehm, Jena (DE)

(73) Assignee: J-FIBER GMBH, Jena (DE)

( * ) Notice: Subject to any disclaimer, the term of this patent is extended or adjusted under 35 U.S.C. 154(b) by 0 days.

(21) Appl. No.: 15/308,549

(22) PCT Filed: May 6, 2015

(86) PCT No.: PCT/EP2015/059957
§ 371 (c)(1),
(2) Date: Nov. 2, 2016

(87) PCT Pub. No.: WO2015/173089
PCT Pub. Date: Nov. 19, 2015

(65) Prior Publication Data
US 2017/0075147 A1   Mar. 16, 2017

(30) Foreign Application Priority Data

May 12, 2014 (DE) .................. 10 2014 208 920
Dec. 5, 2014 (DE) .................. 10 2014 224 964

(51) Int. Cl.
C03B 37/012 (2006.01)
C03B 37/027 (2006.01)
G02B 6/024 (2006.01)
G02F 1/01 (2006.01)

(52) U.S. Cl.
CPC ...... *G02F 1/0134* (2013.01); *C03B 37/01217* (2013.01); *C03B 37/01234* (2013.01);
(Continued)

(58) Field of Classification Search
CPC ........ C03B 37/01217; C03B 37/02709; C03B 2203/31; C03B 2203/30; C03B 2205/08; C03B 2205/12; G02B 6/024; G02B 6/105
See application file for complete search history.

(56) References Cited

U.S. PATENT DOCUMENTS 4,978,377 A * 12/1990 Brehm .............. C03B 37/01217
385/126
5,152,818 A   10/1992 Berkey et al. ................. 65/412
(Continued)

FOREIGN PATENT DOCUMENTS

EP   2 322 489   5/2011 ........... C03B 37/012
EP   2 314 549   10/2013 ........... C03B 37/012
(Continued)

OTHER PUBLICATIONS

The Notification Concerning Transmittal of International Preliminary Report on Patentability (Chapter I of the Patent Cooperation Treaty), in English, dated Nov. 24, 2016, which was issued by by the International Bureau of WIPO in Applicant's corresponding international PCT application having Serial No. PCT/EP2015/059957, filed on May 6, 2015.
(Continued)

*Primary Examiner* — Jerry M Blevins
*Assistant Examiner* — Erin Chiem
(74) *Attorney, Agent, or Firm* — Bodner & O'Rourke, LLP; Gerald T. Bodner; Christian P. Bodner (57) ABSTRACT

The invention relates to a method for producing a polarization-maintaining optical fiber, consisting of a core region and stress-generating elements embedded in the fiber body, having the following method steps: producing a core preform for the core region using internal deposition on a substrate tube, the internally coated substrate tube subsequently being collapsed, generating recesses on the core
(Continued)

preform by virtue of the material on the outer surface of the core preform being removed parallel to the longitudinal axis of the core preform at diametrically opposed positions, filling the recesses with stress-generating rods, with the tightest possible rod packing, in a freely selectable first filling geometry, possibly filling the recesses in addition with non-stress-generating rods in a second filling geometry, sheathing the filled core preform with a jacketing tube, preparing the sheathed core preform for a fiber-drawing process, and drawing the sheathed arrangement to form the optical fiber. A preform for producing a polarization-maintaining optical fiber contains a core preform, having a core region and a lateral region, and also contains a jacketing tube, which encloses the core preform, as well as stress-generating elements contained in the lateral region, wherein the stress-generating elements are provided in the form of recesses in the lateral region, wherein the recesses are filled with doped rods and/or undoped rods, and wherein the rod filling forms a first and/or a second arrangement geometry.

10 Claims, 7 Drawing Sheets

(52) U.S. Cl.
CPC ........ *C03B 37/02709* (2013.01); *G02B 6/024* (2013.01); *C03B 2203/30* (2013.01); *C03B 2203/31* (2013.01); *C03B 2205/08* (2013.01); *C03B 2205/12* (2013.01)

(56) References Cited

U.S. PATENT DOCUMENTS

| | | | |
|---|---|---|---|
| 6,701,046 B1 * | 3/2004 | Pianciola | G02B 6/2843 385/11 |
| 6,778,747 B1 * | 8/2004 | Bhagavatula | C03B 37/01211 385/123 |
| 8,098,966 B2 * | 1/2012 | Bayindir | B29D 11/00663 385/101 |
| 8,286,450 B2 * | 10/2012 | Dowd | C03B 37/01217 65/404 |
| 8,434,330 B2 * | 5/2013 | Olsen | C03B 37/01217 428/542.8 |
| 2011/0097048 A1 | 4/2011 | Olsen | 385/124 |

FOREIGN PATENT DOCUMENTS

| | | | |
|---|---|---|---|
| GB | 2 122 599 | 1/1984 | ............ C03B 20/00 |
| JP | S58 104035 | 6/1983 | ............ C03B 37/00 |
| JP | S60 33513 | 2/1985 | ........... C03B 37/012 |

OTHER PUBLICATIONS

The English translation of the International Preliminary Report on Patentability (Chapter I of the Patent Cooperation Treaty), dated Nov. 15, 2016, which was issued by the International Bureau of WIPO in Applicant's corresponding international PCT application having Serial No. PCT/EP2015/059957, filed on May 6, 2015.
The Written Opinion of the International Searching Authority, in English (Nov. 15, 2016—mailed with the English translation of the International Preliminary Report on Patentability), which was issued by the International Bureau of WIPO in Applicant's corresponding international PCT application having Serial No. PCT/EP2015/059957, filed on May 6, 2015.
The International Search Report, in English, dated Aug. 11, 2015, which was issued by the International Bureau of WIPO in Applicant's corresponding international PCT application having Serial. No. PCT/EP2015/059957, filed on May 6, 2015.

* cited by examiner

POLARIZATION-MAINTAINING OPTICAL FIBRE AND PREFORM AND METHOD FOR PRODUCING THE SAME

The invention relates to a method for producing a polarization-maintaining optical fiber according to Claim 1, a preform for producing a polarization-maintaining optical fiber according to Claim 8, and a polarization-maintaining optical fiber according to the patent claims.

A polarization-maintaining optical fiber is understood as a special type of an optical fiber, in which the polarization state of the linearly-polarized light wave coupled into the fiber is maintained during propagation within the fiber. The two most important types of such fibers are the so-called bowtie type and the so-called PANDA type. Both fiber types have elements for generating stress in their cladding region, so-called stress applying parts (SAP), with the aid of which a defined stress birefringence is generated in the corner region.

Polarization-maintaining fibers find a broad application in telecommunications, fiber sensors, and high-performance fiber lasers. Bowtie and PANDA preforms are presently manufactured using the following production processes.

The classical production method for bowtie preforms is described, for example, in GB 2122599 A. This production method makes use of a so-called modified chemical vapor deposition process (MCVD process), i.e., a chemical vapor phase deposition, and is essentially divided into 4 steps:

Firstly, boron-doped layers are deposited, which function later as stress applying parts. This is followed by selective gas phase etching on diametrically opposite points of the internally coated substrate tube by oxyhydrogen burners, which are each positioned in a closely bounded azimuth outside the tube, wherein the boron-doped layer is removed at diametrically opposed positions by gas phase etching. Optical wave guiding is achieved by the deposition of inner cladding layers, which are adapted with respect to the index of refraction to the outer undoped cladding (i.e., tube material), and core layers having positive index of refraction difference from the inner cladding. A collapse of the finished coated tube into a solid preform is performed.

The bowtie preform and fiber designs producible using the classical manufacturing method have the following disadvantages:

The deposited highly boron-doped layers having a boron concentration of typically approximately 15 to 20 mol-% have a significantly lower viscosity and a significantly higher coefficient of thermal expansion than undoped $SiO_2$. High boron concentrations in the corresponding layers therefore result in high thermal stresses upon the collapse, which are frequently the cause of the shattering of the preform.

Due to the azimuthal differently doped regions having the different viscosities and different coefficients of thermal expansion related thereto, the core geometry (and in most cases also the external geometry) deviates from the circular shape after the collapse. This deviation is referred to as the ovality O and can be defined by the following definition according to DIN EN 10253:

$$O=100*(Dmax-Dmin)/Da$$

Da=nominal external diameter
Dmax=largest measured external diameter
Dmin=smallest measured external diameter In this case, instead of the external diameter, in each case the core diameter is to be used in order to calculate the core ovality.

The bowtie preforms manufactured according to the classical method therefore generally have elevated values (as a rule greater than 10%) of the so-called core ovality, and preform losses due to shattering as a result of high thermal stresses between the boron-doped layers and the undoped cladding regions frequently occur.

The production method of PANDA preforms is also distinguished by a high level of technological effort. In the starting preform, holes have to be precisely drilled in the preform longitudinal direction into the preform cross-section at two diametrically opposed angular positions. Previously known ultrasonic drilling methods are limited with respect to the achievable drilling depths to values up to approximately 0.5 m and with respect to the precision of the boreholes with regard to parallelism to the core axis. The drilled holes have to be lapped and polished after the drilling, so that after the introduction of the two SAPs and the fusing during the fiber drawing procedure, no undesired bubbles arise on the internal interfaces. The preform length is therefore limited to the drilling depth. When drilling from both sides, to thus achieve preform lengths in twice the drilling depth, an offset of the boreholes frequently occurs. The SAP can be mechanically damaged at the abutting edge, in addition, a sudden change of the preform geometry occurs at this edge.

Due to the introduction of stress applying rods which are large in relation to the total diameter of the starting preform and which do not completely fill up the drilled holes, but rather must have a smaller diameter than the drilled hole to be able to be introduced without interference, material displacements occur in many cases during the drawing of such preforms, because the stress applying parts already have extremely low viscosity at significantly lower temperature. Due to these material displacements, a deformation of the core of the starting preform takes place upon fiber drawing, so that fibers having oval cores are also frequently obtained with this production method.

Both production technologies require a high level of technological expenditure and only enable the manufacturing of comparatively small and/or short preforms. The rejection rate is high as a result of the plurality of critical processing steps.

A manufacturing technology for producing PANDA preforms and fibers is described in EP 2314549 B1, in order to simplify the manufacturing process and increase the fiber yield of the preform. In particular, drilling the two holes in the preform longitudinal direction has proven to be difficult, because both holes have had to be aligned exactly in parallel to the preform core. In addition, holes could not be drilled over greater preform lengths with the required accuracy. After the drilling, it was necessary to polish the inner borehole surfaces.

It is proposed in EP 2314549 B1 that a longitudinal channel be cut through the external circumferential surface thereof in a manufactured core preform at two diametrically located positions of the preform and the channels each be charged with a stress applying part so that the stress element protrudes beyond the external circumferential surface of the core preform, but is still located within the external jacketing tube.

The birefringence-inducing stress element therefore has a cross-sectional region which is essentially equal to that of the longitudinal channel, wherein the stress element protrudes outside the external circumferential surface of the core preform in one section, however. The resulting cross-sectional design is based on the PANDA design, although the SAPs in the later fiber do not have an exactly circular shape. Therefore, significantly longer preforms can also be produced. However, the disadvantage also exists in this manufacturing technology that stress applying parts consists of very large rods, so that material displacements can occur here due to the radially differing heating, which in turn result in a core ovality.

Patent specification U.S. Pat. No. 4,978,377 describes methods for processing a preform for PM fibers. The teaching contained in U.S. Pat. No. 4,978,377 relates to the production of bowtie fibers having high birefringence. According to the document, it proceeds from a carrier tube, on the interior of which boron-doped layers are deposited. The internally-coated carrier tube is subsequently mechanically or thermally divided, for example, using a $CO_2$ laser. However, such a division into four tube regions in the form of circular ring sectors is only possible at relatively low boron concentrations. However, the resulting birefringence in the finished PM fiber is also very limited at low boron concentrations. In the solution mentioned in U.S. Pat. No. 4,978,377 the problem is to divide a carrier tube provided with highly $B_2O_3$-doped inner layers into four equally large sectors, without the tube shattering due to the existing extreme stresses between the undoped outer carrier tube and the highly $B_2O_3$-doped inner layers. The production of undoped carrier tubes provided internally with $B_2O_3$-doped layers is not possible at the required high boron concentrations. Such tubes are therefore also not commercially available. The method disclosed in U.S. Pat. No. 4,978,377 is therefore practically not implementable for the production of PM fibers having high birefringence.

The object therefore exists of specifying a method for producing a polarization-maintaining preform and fiber, which is distinguished by reduced core ovality. Furthermore, the object exists of specifying a design for such a preform and a fiber, using which both polarization-maintaining properties and also reduced core ovality can be achieved in the best possible fashion.

The object is achieved by a method for producing a polarization-maintaining optical fiber having the features of Claim 1, a preform for producing a polarization-maintaining optical fiber having the features of Claim 8, and a polarization-maintaining optical fiber having the features of the patent claims. The dependent claims each contain expedient and/or advantageous embodiments of the method, the preform, or the optical fiber, respectively.

The method for producing a polarization-maintaining optical fiber, consisting of a core region, and stress applying parts embedded in the fiber body, is executed using the following method steps:

In a first step, a production of recesses in the form of circular sectors on the cross-sectional area of a core preform is executed by removing the material on the outer surface of the core preform in parallel to the longitudinal axis of the core preform at diametrically opposing positions.

Thereafter, the recesses are filled with rods in a rod packing, wherein at least a part of the rods used have a stress applying effect. The filled core preform is then inserted centrally into a jacketing tube. The actual preform for the subsequent fiber drawing process results at this time.

It has proven to be particularly advantageous to use rods whose external diameter is less than ½ of the internal diameter of the circular ring sector, preferably less than ⅕, and particularly preferably 1/10 of the internal diameter of the circular ring sector.

The preform is prepared for a fiber drawing process and finally the sheathed arrangement is drawn to form the polarization-maintaining optical fiber.

In one embodiment, the filling of the recesses with the stress applying rods is carried out in a first filling geometry, wherein supplementary filling of the recesses with non-stress applying rods is executed in a second filling geometry. In particular, bowtie designs or PANDA designs may thus be alternately manufactured.

Doped rods are used as the stress applying rods, which have a coefficient of thermal expansion changed in relation to the surrounding cladding material. Due to the differences in the coefficient of thermal expansion, stresses are induced in the drawn fiber, which in turn generate the desired birefringence in the fiber core.

In one expedient embodiment of the method, the ratio of the internal diameter of the recesses in the form of circular sectors to the core diameter is less than 3.0, preferably less than 2.0, and the ratio of the external diameter of the recess in the form of a circular ring to the diameter of the cladding of the preform/fiber is less than 0.9 and preferably less than 0.8.

In one embodiment, the stress applying doped rods can also be doped differently, wherein a mechanical stress birefringence profile of the later fiber can be predetermined during the manufacturing of the preform due to the different doping.

In one embodiment, during the filling of the recesses, an undoped rod is arranged in each case in the region of the outermost edges of the recess, to prevent a penetration of doped rod material between core preform and jacketing tube during the subsequent drawing and fusing process.

In addition, during the preparation of the sheathed core preform for the fiber drawing process, fusing of a drawing bar can be performed in the region of the end face of the preform, wherein a drawing tip may be formed more easily with reduced furnace temperature by the drawing bar. In this case, during the drawing of the sheathed arrangement, a partial vacuum is applied between core preform and jacketing tube, so that a penetration of doped rod material between core preform and jacked tube is preventable over the entire drawn fiber length as a result of the reducible furnace temperature, as a consequence of the fused drawing bar, in combination with the partial vacuum. These measures are used for a defined and correctly contoured formation of the SAPs in the drawn optical fiber. A "reduced furnace temperature" is understood here as a temperature set in the drawing furnace which can be lower in the method according to the invention than the temperature typical for drawing processes in the case of preforms having comparable structure.

As a result of the fiber drawing process, in one embodiment, the ratio of the diameter of the preform to the diameter of the finished optical fiber is less than 250, in one particularly preferred embodiment less than 150.

A preform for producing a polarization-maintaining optical fiber contains a core preform having a core region and a core sheath region and also a jacketing tube which encloses the core preform. Stress applying parts are contained in the core sheath region of the core preform, wherein the stress applying parts are designed in the form of recesses of the core sheath region. In this case, the recesses are filled with doped rods and/or undoped rods, wherein the filling of the rods forms a first and/or a second arrangement geometry.

The stress applying doped rods can have a doping differing from one another if needed.

It is also possible that the fillings contained in the recesses each have at least one undoped rod in the region of the outermost edges of the recess.

In one embodiment, the jacketing tube has an internal diameter which is at least 0.5 mm, preferably at least 1 mm larger than the external diameter of the filled core preform. The gap width is ideally selected so that after the fusing of the overall structure, a perfect external cylinder symmetry is achieved.

A polarization-maintaining optical fiber, consisting of a core region having a cladding region, wherein the cladding region contains stress applying parts, is distinguished in that the core region has an ovality of less than 10%, preferably less than 6%.

A further polarization-maintaining optical fiber according to the invention, consisting of a core region having a cladding region, wherein the cladding region contains stress applying parts, is distinguished in that the core region has an ovality of less than 10%, preferably less than 6%, wherein the birefringence caused by the stress applying parts in the core region has a value greater than $6 \times 10^{-3}$.

The stress applying parts in the cladding region have the form of a circular ring sector in the fiber in particular in one embodiment.

In one embodiment, the stress applying parts have dopants which result in different coefficients of thermal expansion in comparison to undoped quartz glass within the stress applying parts.

The stress applying parts are doped using a chemical element which reduces the index of refraction (for example, boron and/or fluorine) or in combination with a chemical element which increases index of refraction (for example, aluminum, phosphorus, germanium, titanium) so that the resulting index of refraction is less than or equal to the index of refraction of the surrounding cladding.

The stress applying parts have an index of refraction which is less than or equal to the index of refraction of the cladding region. Undesired wave guiding is thus prevented from taking place in the stress applying parts.

The birefringence in the core region caused by the stress applying parts has in particular a value greater than $3 \times 10^{-4}$, preferably greater than $5 \times 10^{-4}$, and particularly preferably greater than $7 \times 10^{-4}$.

The production method, the preform used for this purpose, and the polarization-maintaining optical fiber will be explained in greater detail hereafter on the basis of exemplary embodiments. FIGS. 1 to 7 are used for illustration. The same reference signs are used for identical or identically acting parts.

The structure of the polarization-maintaining optical fiber according to the invention has a core region, an inner sheath region in the form of an inner cladding, and an outer sheath region in the form of an outer cladding, to maintain polarization, a region having stress applying parts (SAPs) is provided, wherein the SAPs are located in the outer sheath region.

The core region contains a wave guiding core having increased index of refraction in comparison to the sheath region. Single-mode, multimode, and so-called few-mode cores can all be used as the core. These differ due to the number of guided modes. In single-mode fibers, only the fundamental mode is transmitted, in multimode fibers, multiple modes are transmitted as a function of the core diameter, the profile shape, and the numeric aperture. Few-mode fibers are used if only a few modes are to be transmitted. The cores can have various dopants and profile shapes depending on the field of application. Thus, generally grade index profiles are used for single-mode fibers, while in multimode fibers, gradient index profiles are also increasingly being used in addition to grade index profiles, to increase the transmission capacity. In principle, however, combinations of grade index and gradient index profiles are possible, or the use of adapted profile shapes. In general, germanium and/or phosphorus are used as dopants which increase the index of refraction of the core region. If the core is to be used as an active laser core, the doping is carried out using a rare earth metal and further co-dopants (especially aluminum and phosphorus). Predominantly fluorine and boron are used as dopants which reduce the index of refraction.

The sheath region is generally produced from undoped quartz glass, in principle, however, doping can also be performed here. For the SAPs, dopants are used which have the highest possible influence on the stress birefringence. The greatest possible difference between the coefficients of thermal expansion of the SAP and the surrounding cladding region is required for this purpose. For example, germanium, titanium, phosphorus, or aluminum can be used as SAP dopants, wherein a co-dopant is required here, because the index of refraction of the SAP is to be less than or equal to the index of refraction of the sheath region, to prevent an additional waveguide in the cladding. Fluorine or boron is used for the co-dopant. Because boron-doped quartz glass has a significantly different coefficient of thermal expansion than pure quartz glass and the index of refraction decreases, the SAPs can also be doped exclusively using boron.

The design according to the present invention has the advantage over the classical designs, i.e., the designs of the PANDA and bowtie types, that the core ovality is less. In the bowtie design, the very high core ovality results from the fact that an asymmetrically coated tube has to be collapsed. In the method according to the invention, the core preform results due to the collapse of a symmetrically coated tube. In the PANDA design, a preform is produced which uses two solid rods as the SAPs. During the fiber drawing, this entire preform has to be so strongly heated that it can be drawn to form the fiber. Material displacements can occur within the preform in this case, because, on the one hand, the SAPs have a significantly lower viscosity and in addition they also soften at a lower temperature. Furthermore, during the production of the preform, it can occur due to the drilling method used that the core does not have exactly equal distance from both SAPs. The regions around the core thus soften at different points in time, which results in a change of the core geometry, which in turn results in a core ovality.

These disadvantages can be minimized by the production method according to the invention and therefore a polarization-maintaining fiber having reduced core ovality and very high birefringence can be produced.

Figure 1:
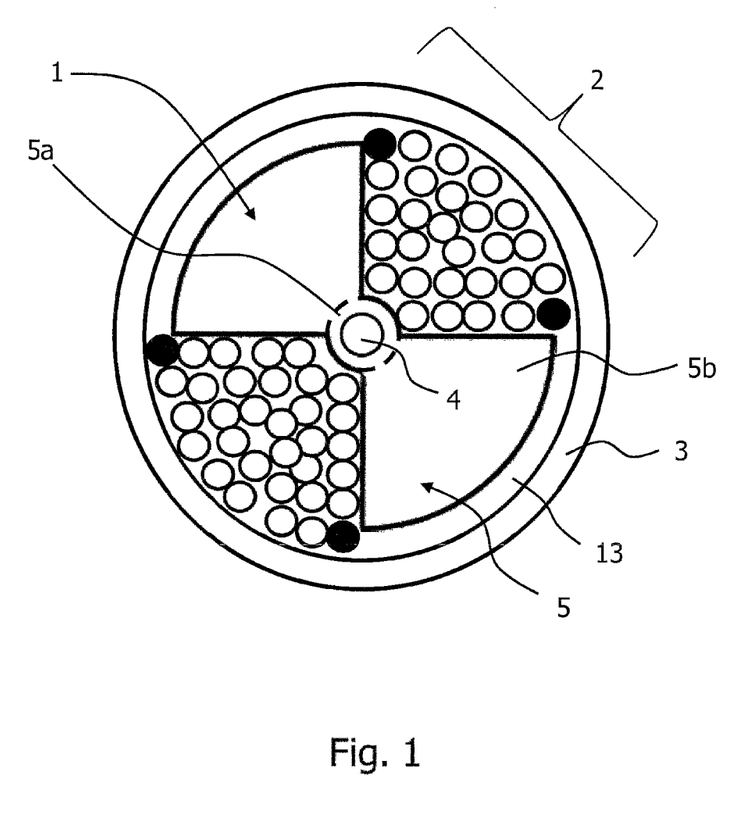
FIG. 1 shows an overall illustration of an exemplary preform according to the invention in cross section.
Figure 2:
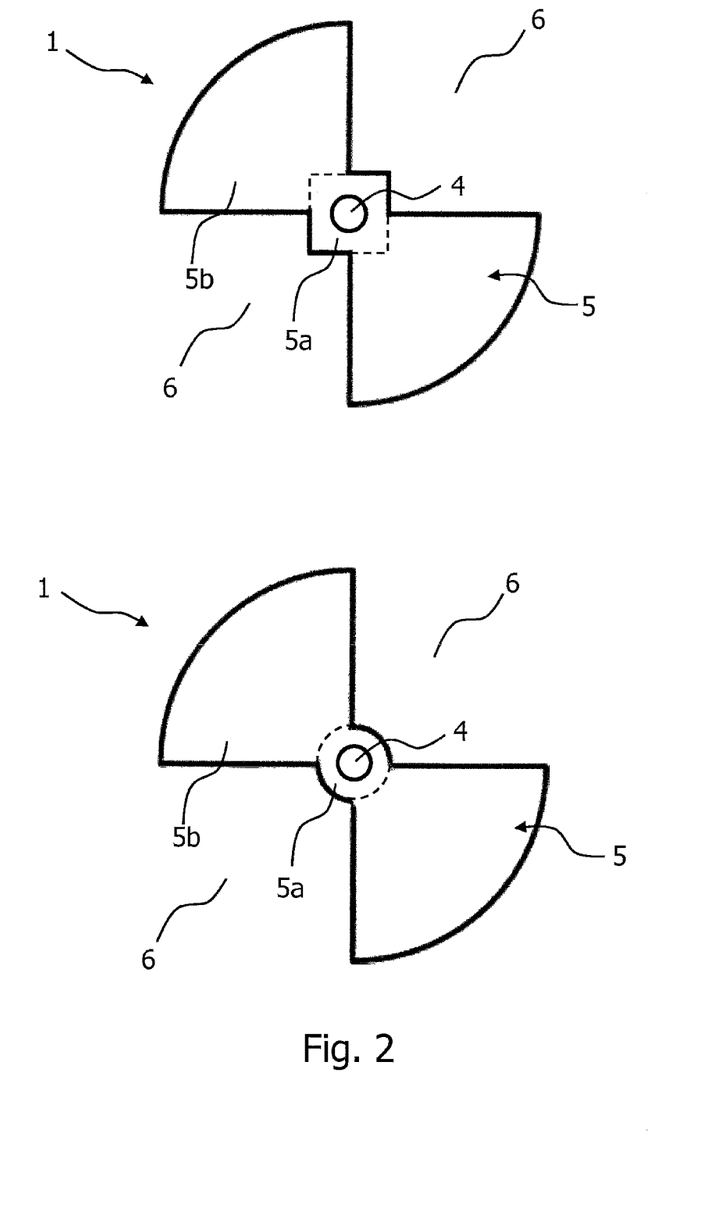
FIG. 2 shows exemplary cross sections of core preforms, after the outer sheath regions in the form of circular sectors have been removed.

FIG. 1 firstly shows the structure of a typical preform for producing the polarization-maintaining optical fiber. FIG. 2 shows the structure of a core preform. FIGS. 3 to 7 appended thereto show individual manufacturing steps of the preform and/or the polarization-maintaining fiber.

FIG. 1 shows an exemplary typical preform for manufacturing the polarization-maintaining optical fiber. The preform consists of a core preform 1, an arrangement of stress applying parts 2 positioned around the core preform, and a jacketing tube 3, which encloses the core preform and the stress applying parts.

According to FIG. 2, the core preform 1 has a core region 4 and a core sheath region 5. The core sheath region 5 is in turn divided into an inner core sheath region 5a and an outer core sheath region 5b. The core region 4 and the core sheath region 5 can, but do not have to, differ in the index of refraction thereof. The geometrical cross-sectional shape of the outer delimitation line of the inner core sheath region, which arises upon the removal of parts of the core sheath region, can differ. For example, a polygonal, in particular a square shape is possible, or also a cross-sectional shape in the form of a circle or circular sector, of course.

The core preform has recesses 6. These extend in the direction of the longitudinal axis of the core preform and are located at positions diametrically opposite to one another with respect to the cross section of the core preform. The cross-sectional shape can also be geometrically designed, arbitrarily. A sector shape is preferably selected, the aperture angle of which is 90°. The circular ring sector can be delimited in this case by two concentric circles, for example, in the lower example from FIG. 2, but can also have a polygonal delimitation as in the upper illustration from FIG. 2. The recess can also, independently of the specific embodiment thereof, extend almost up to the core region or exclusively extend in the core sheath region of the core preform. In summary, manifold embodiments are thus possible here.

The production of the preform is performed in multiple steps. Firstly, the core preform 1 is provided, wherein the precise production of the core preform per se is of secondary significance.

The application of an internal deposition technology, which is known per se, is advantageous in the production of the core preform. In the case of such an internal deposition technology, for example, modified chemical gas phase deposition (modified chemical vapor deposition—MCVD), glass material is deposited in layers in a substrate tube and fused into a transparent layer. The various layers can have different dopants. After the production of the individual layers, wherein the last deposited layers form the later core of the core preform, the internally-coated substrate tube is collapsed. A round core arises in the interior at this time. This structure can be collapsed to form a nearly perfect cylindrically-symmetrical core preform. Therefore, the core ovality of the core preform is reduced to a minimum. A cylindrical starting shape as in the upper illustration from FIG. 3 results in this case, having the core region 4 and the core sheath region 5. The core sheath region consists of an inner core sheath region 5a, which is arranged directly around the core region 4, and an outer core sheath region 5b, which adjoins radially outward. Both regions are shown separated from one another by a dashed line here. Depending on the embodiment, both regions can be designed differently, in particular doped differently. In the example from FIG. 2 it is shown in particular that the inner core sheath region can be embodied both as polygonal and also having a contour like a circular sector as a circular ring.

Figure 3:
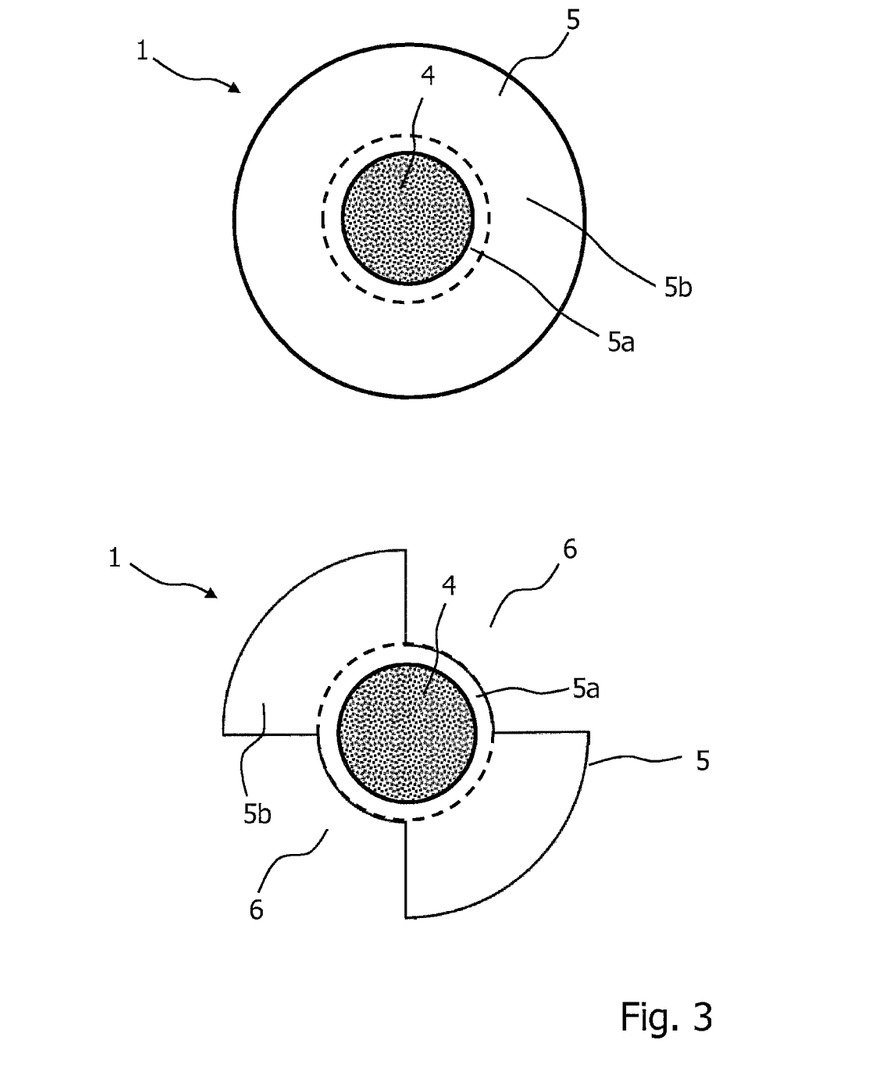
FIG. 3 shows an exemplary, manufacturing step to produce the core preforms.
Figure 4:
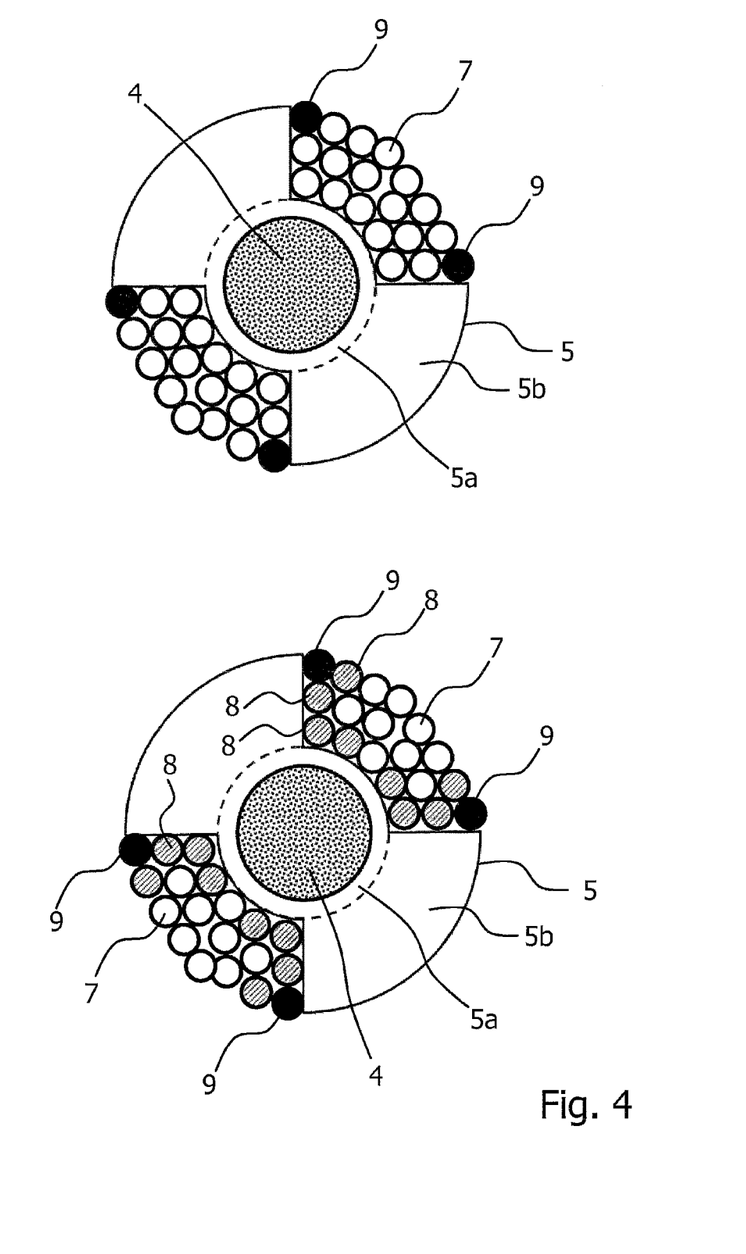
FIG. 4 shows an exemplary manufacturing step to equip the prepared core preform with stress applying rods.

Subsequently, as shown in FIG. 3, the outer core sheath material is partially or entirely removed up to the outer delimitation of the inner core sheath region in a defined region in parallel to the core axis at diametrically opposing positions of the prefrm in cross section. The recesses 6 arise in this case. These leave the inner core sheath region 5a uninfluenced in the example provided here and are exclusively incorporated into the outer core sheath region 5b. It is expedient not to work out the recesses directly up to the core region 4, so as not to disadvantageously influence the wave guiding therein. However, a recess leading up to the core region of this type is readily executable and can also be implemented if it is accompanied by an advantageous effect.

The region which is to be removed from the core preform cross section can in principle have arbitrary geometries, wherein it has proven to be advantageous to remove a circular ring sector having an angle of approximately 90°. Both designs from FIG. 2 and similar designs can be used without disadvantages in the further processing. It is ensured by the design that the regions similar to a circular ring sector achieve an azimuth angle extension of nearly 90°. The ratio of the minimum internal core sheath diameter to the core diameter is also established by the design and should not significantly fall below values of 2. In the exemplary embodiment from FIG. 3, the recesses are exclusively located in the outer core sheath region 5b and do not extend into the core region 4. The recesses can extend partially or also completely up to the outer delimitation of the inner core sheath region.

The removal of the region of the recesses can be performed by the known technologies of glass processing, for example, grinding, etching, sawing, drilling, milling, laser cutting, or others. Depending on the type of the processing, it can be necessary to touch up the surface. Known technologies for surface improvement, for example, lapping or polishing, can again be used for the processing. The goal in this case is to produce a surface which is free of contaminations, for example, grinding residues or metallic contaminants, and has the least possible roughness. The desired roughness of the processed core preform is less than 0.5 µm. This is helpful to be able to carry out the fusing of the SAPs with the core preform without problems in the further processing steps.

Doped rods 7 are used as the SAPs, which induce a maximum of stress birefringence in the later fiber core due to the greatest possible difference in the coefficients of thermal expansion with respect to the material of the core sheath section. In this case, the highest possible dopant concentration is preferred, because the dopant concentration is directly proportional in a first approximation to the generated birefringence in the fiber. However, lower doping concentrations can also be used depending on the desired application, to intentionally set a desired stress birefringence.

The recesses 6 of the core preform 1 are filled in the densest-possible packing with rods 7 up to somewhat beyond the external diameter of the core preform. The sole cross-sectional area of all rods is to be selected in this case so that the total thereof corresponds to the cross-sectional area of the two recesses of the core preform. The rods do not fill up the intermediate space between the remaining circular ring regions of the core preform and jacketing tube. Rods are only arranged in the recesses 6 of the core preform. However, the rods are filled up to the inner jacketing tube boundary in this angle range of approximately 90° each.

The geometry of the SAP can be defined by the selection of the rods. For example, if the entire recess is filled with rods, the doping of which corresponds to the doping of the SAP, a bowtie design results. If, in addition to the SAP-doped rods, rods 8 are also used, the doping of which is adapted to the core sheath region and/or the region of the jacketing tube, these do not form SAPs in the drawn fiber, but rather finally core sheath regions. Therefore, the geometry of the SAP may be adjusted arbitrarily and is in principle only limited by the diameter of the rods used. It is furthermore possible to set a change of the doping concentration by way of SAP rods doped at different strengths within the SAP, in order to thus take influence on the stress birefringence of the fiber in a desired manner.

An undoped quartz rod 9 is positioned on each of the outer edges of the circular ring sectors, so that upon fusing of the arrangement, doped glass of the rods 7 cannot enter the intermediate space between core preform and jacketing tube outside the ground circular ring sectors. At the relatively high fiber drawing temperatures of 1500 to 2000° C., the viscosity of the doped glass is significantly different from the viscosity of the core, the sometimes doped inner core sheath region, and the undoped glass regions (outer core sheath and cladding). The undoped rods 9 prevent the glass, which has different viscosity, of the doped rods from flowing on the outer circular ring sector edges into the intermediate space during the fiber drawing and interfering with the desired design.

It is expedient if the solid material remains on at least one axial end of the core preform, so that the recess ends at the position located there. The positioning of the thin rods in the direction of the longitudinal axis of the core preform is thus simplified.

Figure 5:
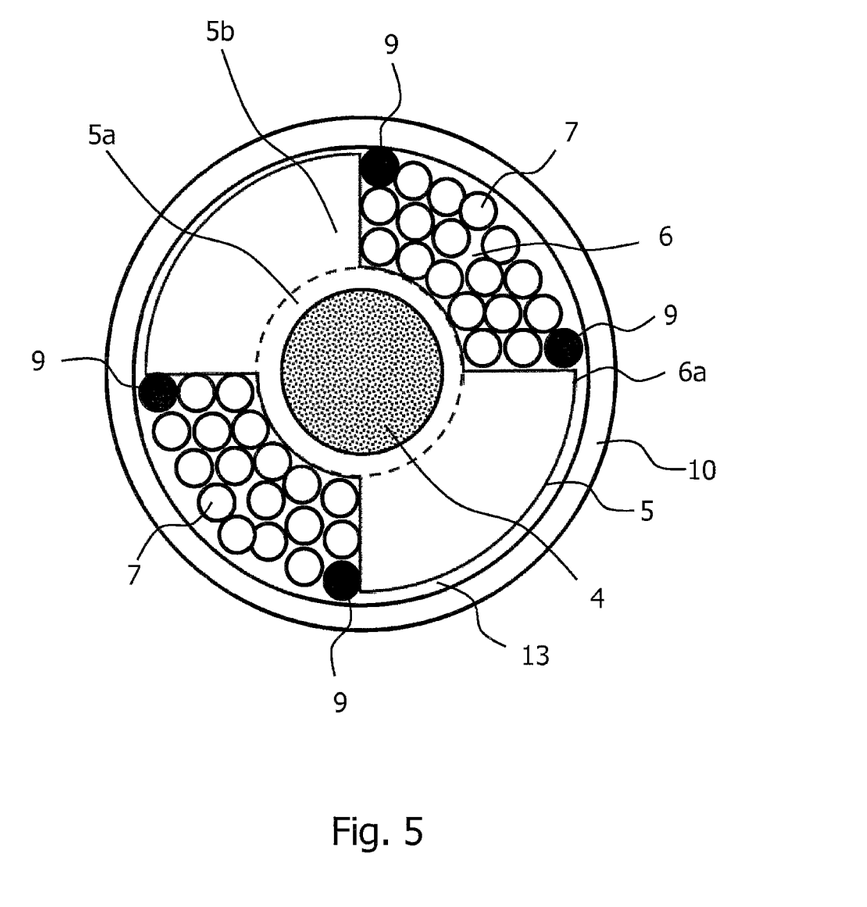
FIG. 5 shows an illustration of the sheathing of the equipped core preform with a jacketing tube in cross section.

The core preform together with the filled rods is finally inserted, as shown in FIG. 5, into a jacketing tube 10 and subsequently drawn to form a fiber. The sheathing with the jacketing tube can either be performed in the preparation for the fiber drawing or directly during the fiber drawing in this case. The jacketing tube has to be selected so that the cross-sectional area thereof is dimensioned so that the desired cross-sectional ratio between core and outer cladding is achieved on the drawn fiber. The jacketing tube additionally has to have an internal diameter which is at least 0.5 mm, preferably 1-2 mm, larger than the external diameter of the core preform, so that the jacketing tube can be pushed without mechanical interference over the core preform. To obtain a fiber having a high level of cylinder symmetry, the total of the cross-sectional areas of all rods ideally has to correspond to the area of the two recesses 6. Both recesses have to be filled in the same manner and as densely as possible. With completed filling, the rod packing as a whole therefore protrudes slightly beyond the external contour of the core preform in cross section.

FIG. 5 additionally shows the mode of operation of the undoped rods 9. They are located on the outer edges 6a of the recesses 6 and keep the doped rods 7 away from this region. During the drawing process, the doped material of the rods 7 thus penetrates at most up to the outer edge 6a, but not beyond it. In the present case here, the rods 9 additionally form an outer contour of the core preform. The central fixing of the jacketing tube in relation to the core preform using rods is performed at the two ends of the core preform.

During the later fusing and during the drawing process of the prepared core preform with the jacketing tube, the intermediate spaces between the doped rods disappear and the jacketing tube achieves the diameter of the core preform in good approximation over the entire circumference. The material of the doped rods then completely fills up the recesses and thus forms in each case the stress applying SAPs. The preform 11 thus prepared is prepared for the fiber drawing after the assembly. For this purpose, reference is made to the illustration from FIG. 6.

Figure 6:
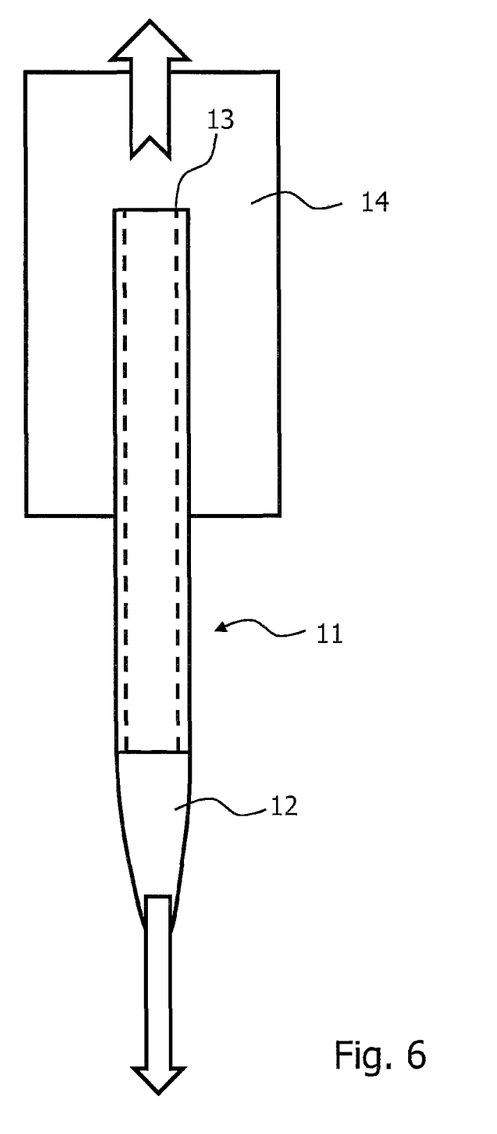
FIG. 6 shows a schematic illustration of the drawing process of the polarization-maintaining optical fiber.

For the drawing, a quartz rod 12 is fused onto the drawing tip of the preform 11. The rod simplifies the drawing in such a manner that at relatively low furnace temperature, the drawing tip can be formed by the drawing of the rod. At the intermediate space 13, which is indicated here by a dashed line, between core preform and jacketing tube, a relatively low partial vacuum of up to 100 mbar can be applied via a partial vacuum device 14 during the drawing of the preform, to close the intermediate space between core preform and jacketing tube early and prevent the penetration of doped glass into the intermediate space between core preform and jacketing tube.

It has proven to be advantageous during the drawing of the prepared bowtie preform to draw thin and long preforms, because the desired structure is maintained best under stationary drawing conditions, if the preform tracking rate is high. The radial temperature gradient is then sufficient to fuse the jacketing tube with the boron rods and the core preform surface. However, the heating of the preform core remains sufficiently low that a deformation of the preform core does not take place, whereby the core ovality increases minimally or not at all during the fiber drawing and has lower values on the finished fiber than in the case of the production methods from the prior art. The process parameters during the drawing process exert an influence on the core ovalities, however. In this case, in particular the furnace temperature, the drawing speed, and the draw-off force of the fiber play a role.

A core ovality less than 10% could be achieved by a selection of suitable parameters. For this purpose, a preform was drawn at a drawing temperature of approximately 1900° C. and at a speed of 10 m/minute. In this case, a traction force of 80 cN was used on the fiber in the axial direction. If a ratio of preform diameter to fiber diameter (diameter of glass without coating) of less than 250 is additionally also used, which has the result that the tracking rate of the preform is high and rapid and uniform heating can take place due to the low preform diameter, a core ovality of less than 6% is achieved.

The solution according to the invention has still further advantages over the prior art. It has been shown that using the method according to the invention, the bowtie design, i.e., the design of the fiber having the circular ring sectors having an angle of 90°, can be approximated best. A significantly increased value of the birefringence in the core region with equal dopant concentration of the SAPs is thus achieved using the bowtie design. Furthermore, the manufacturing sequences are simplified so that very many different SAP geometries can be produced from one core preform, in that the filling of the removed regions with doped/undoped rods is performed in such a manner that the desired SAP geometry results. For example, polygonal or quasi-round SAP structures may be produced. However, more complex structures such as circular rings or spirals can also be produced. Complex structures can be manufactured with very high accuracy by way of the use of very thin individual rods having a diameter of 0.2 to 1 mm.

It is furthermore possible to prepare a core preform with recesses and doped and undoped rods and to assemble them modularly depending on the requirement. A PANDA or bowtie design can thereupon be produced very rapidly in accordance with the requirements. Until now, completely different production methods were required for this purpose according to the prior art.

Figure 7:
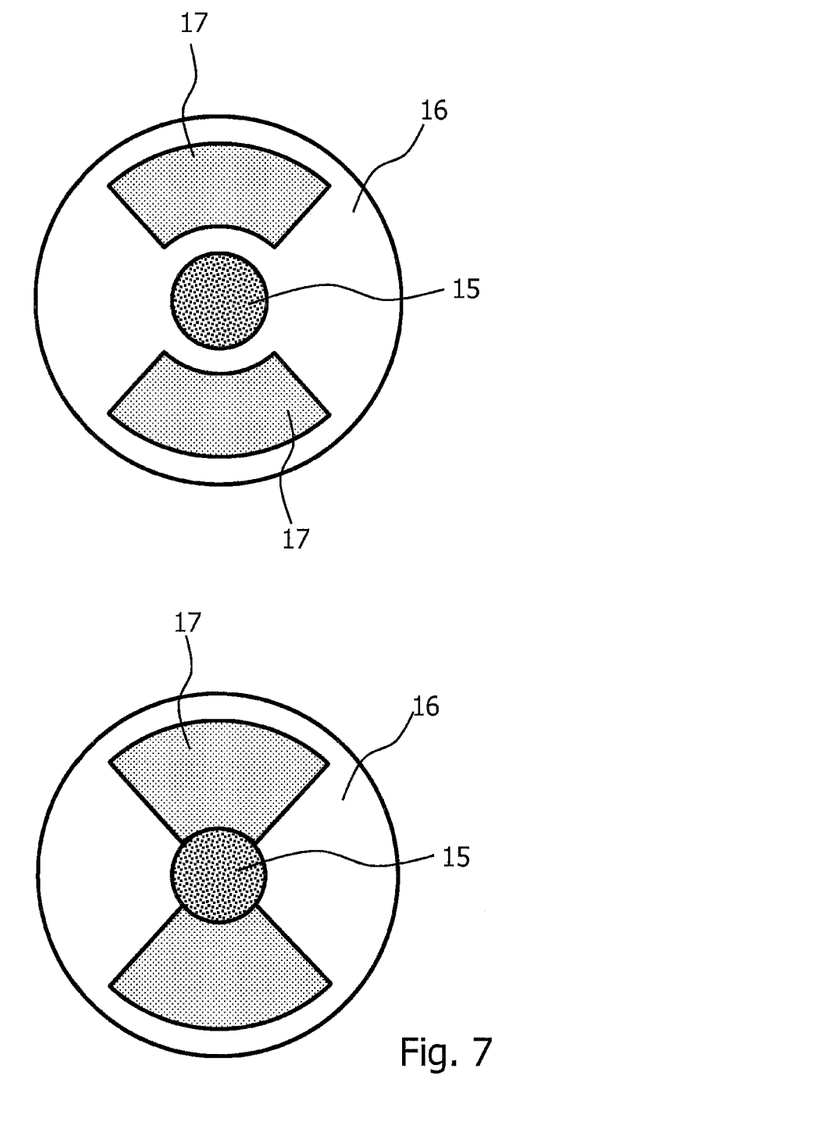
FIG. 7 shows exemplary cross sections of polarization-maintaining optical fibers.

FIG. 7 shows two exemplary cross sections of the polarization-maintaining optical fiber according to the invention, which can be manufactured using the described method. The optical fibers have a fiber core 15, which originates from the core region 4 of the above-mentioned core preform, and a cladding 16, which partially results from the core sheath region of the core preform and from the surrounding jacketing tube during the drawing process. Furthermore, SAP regions 17 are provided, which result from the rods 7, which fused together during the drawing process. Depending on the design of the core preforms and the recesses contained therein, the SAP regions have different designs. In the example shown above from FIG. 7, the SAP regions are completely enclosed by the material of the cladding 15, in the lower design, the SAP regions of the fiber extend almost up to the core region.

The basic structure thus provided, in which the SAP regions can be formed as required in the bowtie or PANDA design, can be modified in manifold alterations as required.

In one exemplary embodiment, the core region is doped using rare earth elements, to produce an active polarization-maintaining fiber. In a refinement, a jacketing tube is additionally used during the manufacturing, which has a larger internal diameter than the core preform, so that an enlarged intermediate space results between jacketing tube and core preform. Further rods are introduced into this enlarged intermediate space between jacketing tube and core preform. These rods are adapted to the index of refraction of the cladding. The number and the geometry of the rods are selected so that during the fusing of the core preform with the rods and the jacketing tube, a non-round structure arises. The jacketing tube either consists completely of a material having a reduced index of refraction in comparison to the core sheath or contains at least one layer having reduced index of refraction, so that the nonround structure of the core sheath region can be used to guide pump light and couple it into the active core. For this purpose, the nonround structure is significant, because mode mixing is thus achieved and therefore a more efficient utilization of the pump light can take place. A further advantage in this embodiment is that the active laser fiber, which has a complicated index of refraction structure, can be produced directly during the fiber drawing in only one process step. This improves, on the one hand, the efficiency of the production process, furthermore problems as a result of the high stresses of the preforms, which otherwise result in the shattering thereof, are avoided. The rejection rate is accordingly also significantly reduced by the method according to the invention.

In another embodiment of the production method, the cutout circular ring sectors are produced by grinding off the sheath material. If a surface roughness of less than 0.5 μm is achieved during the grinding, polishing of the ground surfaces can be omitted. The grinding is executed such that the diameter of the inner core sheath region is 0.5 to 5 times the core diameter. Therefore, the fiber damping can be influenced via the internal diameter of the core sheath region. Furthermore, a procedure is used during the grinding and the selection of the jacketing tube such that the diameter of the core preform approximately corresponds to 0.7 to 0.9 times the final preform diameter. Furthermore, it has proven to be expedient to retain a residue of the sheath material on at least one end of the preform, so that the SAPs are fixed on at least one preform end. In this embodiment, boron rods are used as SAPs, the boron content of which is greater than 15 mol-%, preferably greater than 18 mol-%, and particularly preferably greater than 20 mol-%.

The boron rods consist homogeneously of a highly-$B_2O_3$-doped quartz glass, for example. The production of our boron-doped rods is performed, for example, using the MCVD method in such a manner that boron-doped layers are deposited on the inner side of an undoped carrier tube. However, because the tube shatters as a result of the high stresses between the undoped carrier material and the boron-doped layers upon cooling of this tube, the tube is kept at a sufficiently high temperature until the tube has completely collapsed to form a rod. This rod is then carefully cooled and fused. Subsequently, the outer undoped sheath of the preform is eliminated by a grinding process in the cooled state, so that only the boron-doped core remains. The core consists of homogeneous $B_2O_3$-doped material and can subsequently be processed to form the required thin boron rods.

These boron rods are introduced with a diameter between 1 to 5 mm and preferably 2 to 3 mm into the ground circular ring sectors. The preform thus produced is subsequently drawn according to the above statements. In this embodiment, a core ovality of 6% and a birefringence of $7.5 \times 10^{-4}$ are achieved.

Because of the high thermal stresses during the preform cooling, it is only possible with difficulty to carry out the fusing of core preform, SAP, and jacketing tube before the fiber drawing process. In one embodiment, the prepared preform is provided with a handling part, which enables a partial vacuum to be applied during the fiber drawing, so that the fusing of the individual components can be carried out directly during the drawing of the preform. A critical heating step is thus saved, so that the risk of material shifts is reduced and therefore the core ovality can be minimized.

In a further exemplary embodiment, a lattice is inscribed in the fiber core directly during the drawing of the preforms. In this case, known methods can also be used, for example, the lattice can be coated with a coating before the fiber and irradiated. For this purpose, the desired lattice structure is imaged on the fiber and inscribed into the fiber core using a UV light source. Preforms which have a particularly high germanium content in the core region are preferably used for this purpose. The reflectivity of the lattice is increased and therefore the signal-to-noise ratio is improved by the increased germanium content. Fibers which are produced according to this method generally have a numerical aperture (as a measure of the germanium content) of greater than 0.12, preferably greater than 0.18, and particularly preferably greater than 0.24. The achieved reflectivities are greater than 5%, preferably greater than 10%, and particularly preferably greater than 15%.

Alternatively, the lattice can also be inscribed using a laser in the NIR range, wherein fibers which are enclosed with a protective coating can also be processed here. The lattice is inscribed in the fiber by the irradiation using intensive short pulses. In this case, reflectivities greater than 80%, preferably greater than 90%, and particularly preferably greater than 95% can be achieved.

To increase the birefringence, in a further embodiment, low drawing speeds can be used during the drawing, to minimize the cooling speed. Furthermore, it is possible to reduce the cooling rate using additional furnaces and in this manner also to increase the birefringence. In one example, 2 post-heating furnaces are used, which both have a length of greater than 500 mm, and have a temperature of approximately 1000° C.

In cases in which a particularly high stress birefringence is desired, the undoped region around the core can be significantly reduced in size or removed completely. Therefore, the SAPs directly adjoin the core and also unfold the maximum effect when producing a birefringence. One disadvantage of this arrangement is that the fiber damping generally increases.

The fibers produced according to the invention are used in the production of sensor systems for monitoring, for example, elongation and temperature changes. In this case, a fiber is connected to the measured object so that all temperature or length changes of the object to be measured also act on the fiber. By coupling the light of a light source into the fiber and detecting the transmitted and/or reflected signal, the change of the temperature and length can be determined simultaneously using one fiber. For this purpose, the shifts of the wavelength as a function of the polarization of the mode are registered using a detector. A wavelength shift results in this case for each of the two modes, which is composed of one component of the length and one component of the temperature change. The change of the temperature and length can be determined by numerical analysis. This is performed by an introduction, in particular an inscription carried out using a laser, of a Bragg lattice structure sensitive to temperature changes and/or elongations into the core of the finished fiber having one of the cross-sectional structures according to FIG. 7.

The invention was explained on the basis of exemplary embodiments. Other embodiments result from the dependent claims. Further alterations are possible in the scope of routine measures in the art.

LIST OF REFERENCE NUMERALS 1 core preform
2 stress applying parts (white rings)
3 jacketing tube
4 core region
5 core sheath region
6 recess
6a outermost edge of a recess of the core preform
7 doped rod
8 rod having adapted other doping
9 rod at circular sector edge (undoped)
10 coated jacketing tube
11 finished preform
12 fused-on quartz rod
13 intermediate space between jacketing tube and core preform
14 partial vacuum device
15 fiber core
16 cladding
17 SAP region

The invention claimed is:

1. A method for producing a polarization-maintaining optical fiber, consisting of a core region and stress applying parts embedded in the fiber body, comprising the following method steps:
   producing recesses in the form of circular sectors on the cross-sectional area of a core preform by removing the material on the outer surface in parallel to the longitudinal axis of the core preform at positions located diametrically opposite to one another,
   filling the recesses with stress applying rods,
   sheathing the filled core preform with a jacketing tube to produce the preform for the subsequent drawing process,
   preparing the preform for a fiber drawing process,
   drawing the prepared preform to form the polarization-maintaining optical fiber; and
   the ratio of the internal diameter of the recesses in the form of circular sectors to the core diameter is less than 3.0, preferably less than 2.0, and the ratio of the external diameter of the recess in the form of a circular ring to the diameter of the cladding of the preform/fiber is less than 0.9 and preferably less than 0.8.

2. The method according to claim 1, characterized in that the filling of the recesses with the stress applying rods is performed in a first filling geometry, wherein a supplementary filling of the recesses with non-stress applying rods is executed in a second filling geometry, wherein a difference of the coefficients of thermal expansion, which generates mechanical tensions, between the material of the sheath region and the material of the stress applying rods is induced by a doping of the stress applying rods.

3. The method according to claim 1, characterized in that the stress applying doped rods are doped differently, wherein a mechanical stress birefringence profile is predetermined during the manufacturing by the differing doping and arrangement of the rods.

4. The method according to claim 1, characterized in that, during the filling of the recesses, an undoped rod is arranged in the region of each outermost edge, to prevent a penetration of doped rod material between core preform and jacketing during the subsequent drawing and fusing process.

5. The method according to claim 1, characterized in that, during the preparation of the sheathed core preform for the fiber drawing process, a drawing rod is fused on in the region of the end face of the preform, wherein a reject-free drawing tip of the optical fiber can be formed at reduced furnace temperature by the drawing rod in that during the drawing of the preform, a partial vacuum is applied between core preform and jacketing tube, so that due to the furnace temperature, which is reducible as a result of the fused-on drawing rod, in combination with the partial vacuum, a penetration of doped rod material between core preform and jacketing is preventable over the entire drawn fiber length.

6. The method according to claim 1, characterized in that, as a result of the fiber drawing process, the ratio of the diameter of the preform to the diameter of the finished optical fiber is less than 250.

7. A preform for producing a polarization-maintaining optical fiber, containing a core preform having a core region and a core sheath region and also a jacketing tube enclosing the core preform, and also stress applying parts contained in the core sheath region, wherein the stress applying parts are designed in the form of recesses of the core sheath region, wherein the recesses are filled with doped rods and/or undoped rods, wherein the filling of the rods forms a first and/or second arrangement geometry; and
   the ratio of the internal diameter of the recesses in the form of circular sectors to the core diameter is less than 3.0, preferably less than 2.0, and the ratio of the external diameter of the recess in the form of a circular ring to the diameter of the cladding of the preform/fiber is less than 0.9 and preferably less than 0.8.

8. The preform according to claim 7, characterized in that the external diameter of the stress applying rods is less than ½, preferably less than ¼, and particularly preferably less than ¹/₁₀ of the internal diameter of the circular ring sector.

9. The preform according to any one of claim 7, characterized in that the fillings contained in the recesses each have at least one undoped rod in the region of outermost edges of the recess.

10. The preform according to claim 7, characterized in that the jacketing tube has an internal diameter which is at least 0.5 mm, preferably at least 1 mm larger than the external diameter of the filled core preform.

* * * * *